July 15, 1924.
L. J. LE CLAIR
ULLAGE ROD
Filed May 13, 1922
1,501,407
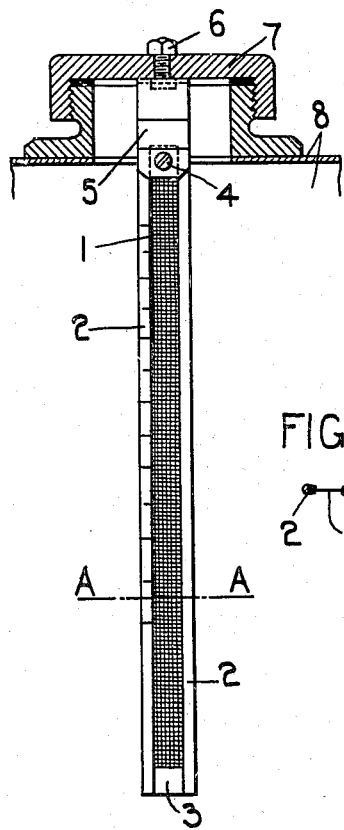
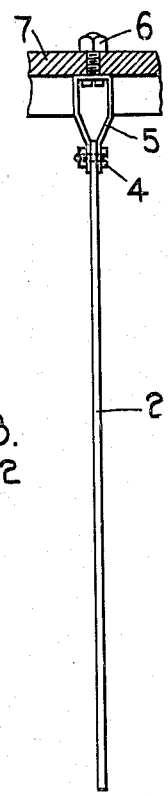
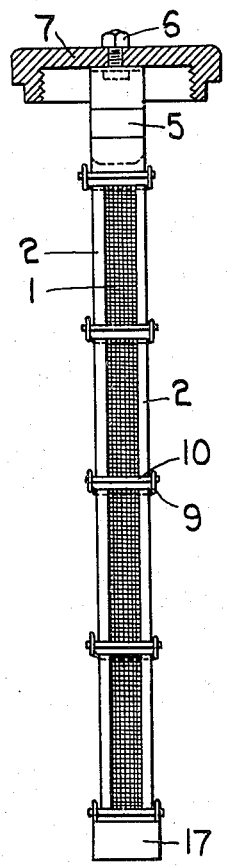
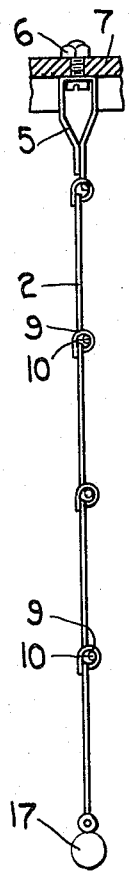
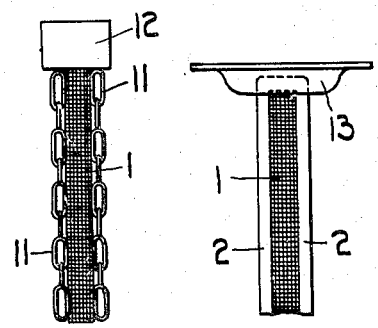
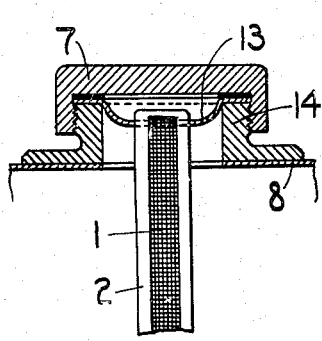
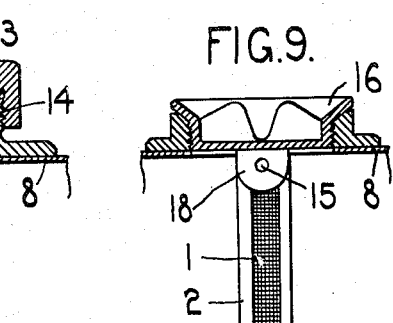
Inventor
Louis J. LeClair
by Herbert W. Jenner,
Attorney.

Patented July 15, 1924.

1,501,407

UNITED STATES PATENT OFFICE.

LOUIS JEAN LE CLAIR, OF MAIDENHEAD, ENGLAND.

ULLAGE ROD.

Application filed May 13, 1922. Serial No. 560,595.

*To all whom it may concern:*

Be it known that I, LOUIS JEAN LE CLAIR, a subject of the King of Great Britain, residing at Maidenhead, Berkshire, England (whose post-office address is Laggan House, Cookham Road, Maidenhead, Berkshire, England), have invented certain new and useful Improvements in Ullage Rods; and I do hereby declare the following to be a full, clear, and exact description of the invention, such as will enable others skilled in the art to which it appertains to make and use the same.

This invention has reference to devices for ascertaining the level of liquid in liquid containers, and the invention has for its particular object to provide a simple, cheap and reliable gauge or dipping rod suitable for use in ascertaining the level of petrol in the petrol tanks of motor vehicles but also suitable for gauging the level of any liquids contained in tanks or other vessels.

The accompanying illustrative drawings show several examples of gauges embodying the invention, all suitable for use in ascertaining the amount of petrol in the petrol tanks of motor vehicles.

Figs. 1 and 2 are elevations at right angles to each other illustrating a simple construction of gauge employing fine metal gauze, removably secured to the cap of the filling orifice of a petrol tank.

Fig. 3 is a cross section corresponding to the line A—A, of Fig. 1.

Figs. 4 and 5 are similar views to Figs. 1 and 2, respectively, illustrating a modification.

Fig. 6 illustrates in elevation the upper part of a gauge according to a further modification.

Fig. 7 shows in elevation a gauge according to the invention permanently secured to a disc, cupped washer, or head adapted to rest on the top edge of the tank filling orifice and to be secured in place thereon by the cap when the same is screwed home.

Fig. 8 shows the upper part of the gauge shown in Fig. 7 fitted in a petrol tank, with the cap of the filling orifice screwed home and thereby holding the gauge down.

Fig. 9 is a similar view to Fig. 1 illustrating a further construction of the improved gauge, fixed to the filling orifice cap.

The gauge illustrated in Figs. 1 to 3 comprises a strip of fine metal gauze 1, such as employed in petrol filters, having its longitudinal edges nipped between the folds of two strips of thin brass or other metal plate 2. The lower end of the gauze strip 1 is clamped between a transverse folded piece of brass or other metal plate 3 which is secured as by soldering to the ends of the side members 2. The sides 2 and transverse end piece 3 may, if desired, be formed in one piece as by suitably bending the metal strip of which they are formed. For use in gasoline or petrol the mesh of the wire is from 80 to 120 per inch, and the size of the wire is from .0048 to .004 of an inch in diameter. A mesh of 100 per inch, and wire of .0048 of an inch in diameter is preferred. The frame is used to hold the fine wire gauze extended.

The upper ends of the side members 2 are secured as by a screw bolt and nut 4 between the arms of a brass or other metal yoke or stirrup 5 adapted to be connected, as by a rivet or a screw bolt and nut 6, to the underside of the screw cap 7 of the filling orifice of a petrol tank 8, see Fig. 1, or, as shown in Fig. 9, the gauge may be secured to a projection or lug 18 formed in one with the cap. It will be seen that when the cap 7 is in place on the tank the gauge extends downwardly into the tank and that upon unscrewing the cap 7 and raising it from the tank the gauge will be withdrawn and the height of the film of petrol on the gauze strip 1 will indicate the depth of the petrol within the tank. If desired one or both of the side members 2 may be calibrated on one or both sides in order that the quantity or depth of petrol within the tank, corresponding to the level indicated by the film of petrol on the gauze strip, may be read off.

The gauge shown in Figs. 1 and 2 is adapted to directly depend into a tank through a filling or other orifice formed in the top thereof but in some constructions of tanks the filling orifice is not directly at the top and in such cases, as also in the case of tanks of peculiar shape, it is desirable or necessary to employ a flexible gauge which can be inserted easily through a horizontally or inclined filling conduit but which will, when within the tank, depend vertically, or at any required angle, downwards into the petrol or other liquid therein.

Numerous constructions of flexible gauges embodying the invention are possible. One such construction by way of example is shown in Figs. 4 and 5. Similarly to the gauge already described with reference to Figs. 1 and 2, the film-carrying body consists of fine metal gauze 1 but instead of the said strip and the side members 2 between which it is clamped being a continuous structure it is constituted by any desired number of lengths suitably articulated together. In the example under notice the articulation is effected by providing the upper ends of the side members 2 of each length of the gauge with eyes 9 that are engaged by pins 10 laterally projecting from the lower end of the adjacent length of the gauge. A cheap and effective method of obtaining this result is to form the eyes 9 and the projecting pins 10 by stamping them out of the sheet metal from which the frame 2 is made.

Such a flexible gauge may be attached to the underside of the cap 7 of the filling orifice of a petrol tank in any suitable manner. In the example illustrated the attachment is by means of a yoke or stirrup 5 as in Figs. 1 and 2, the lower end of the said yoke having lateral pins 10 for engagement by the eyes 9 of the uppermost length of the gauge proper. The gauge may, however, if desired, be separate from the cap and be fitted with a disc, cupped washer or head, as hereinafter described with reference to the straight gauge shown in Figs. 7 and 8.

Another construction of flexible gauge, shown in Fig. 6, comprises side lengths of metal or other chain 11 of any light and appropriate construction, to the links of which a strip 1 of fine metal gauze is secured as by soldering for example, or by riveting or clamping in suitably shaped links. The upper ends of the side chains 11 and the upper edge of the gauze strip 1 are secured to a part 12 adapted to be attached in any desired removable or permanent manner, for example, to a filling orifice cap 7 or to a disc or head such as shown in Figs. 7 and 8.

Flexible gauges according to the invention, however constructed, may be furnished at their free ends with a small weight of brass or other metal, such as the weight 17 shown in Figs. 4 and 5, in order to ensure the free end of the gauge extending to its proper lowermost position.

Although in the illustrated examples described so far the gauge has been attached to the cap 7 of the filling orifice of a petrol tank any other desired arrangement may be adopted.

Fig. 7 shows a gauge, constructed it may be as already described with reference to Figs. 1 to 3 but it might be of any other of the described constructions, directly secured at its upper end, as by soldering or in any other suitable way, to a cupped washer, disc, or head 13 of pressed or stamped metal. The flange of such washer or head is adapted to be gripped between the underside of the cap 7 of the filling orifice of a petrol tank and the upper end of the screwed ring 14 surrounding such orifice and attached to the tank, as shown in Fig. 8. This figure also shows how a strong attachment of the gauge to the washer or head 13 can be effected by allowing the upper end of the gauge to project slightly through a slot formed therefor in the said washer or head and then fixing it thereto as by solder. By gripping the head 13 with the fingers the gauge can be easily raised out of the tank in order to take a reading.

Fig. 9 shows a gauge according to the invention attached as by a screw or rivet 15 to a downwardly extending lug 18 on the underside of a cupped cap 16 of the type with which the petrol tanks of Ford cars are generally fitted.

Instead of employing a number of articulated parts or a chain in order to obtain flexibility, the gauge itself may be rendered flexible, as by making the side members 2, to which the metal gauze is attached, of spring steel for example or other flexible material.

It will be understood that in some cases only part of the gauge may be flexible, for example the upper part, or the lower part, according to the configuration of the tank, the rest of the gauge being stiff.

The gauges hereinbefore described with reference to the drawings embody single thicknesses of metallic gauze but in some cases two or more thicknesses of gauze may be employed; moreover, instead of the complete gauge being in the thin strip form shown in the drawings it may be of cylindrical form or of triangular or other cross section.

As an adjunct for use by motorists the improved gauge is also useful for ascertaining the depth of the oil in engine crank cases.

In using the improved gauge the height of the liquid film thereon can be very clearly seen, as by holding the gauge up towards the light, and the said film retains its level for an appreciable time even if the gauge be held vertically, but if it is desired to retain the indication for a yet longer time the gauge may be held inverted or preferably horizontal in which position considerable time will elapse before the film breaks or sinks.

It will be understood that instead of fixing the gauge to the filling orifice cap of the petrol tank of a motor vehicle it may be constructed as an entirely independent appliance and simply inserted into the tank through the filling orifice when desired.

Should the petrol be washing about in the tank at the time the reading is taken so that doubt exists as to the reliability of the reading it is only necessary to break the film on the gauze as by blowing thereon, wafting it in the air, or wiping it, and to reinsert the gauge in the tank when the petrol is at rest. To avoid incorrect reading due to wash or disturbance of the fluid, the tank may be provided with any well known arrangement of tube or baffling walls within or between which the gauge may be located, the said tube or walls being formed with openings at top and bottom as usual.

Constructional modifications of gauges embodying the invention are numerous and so obvious that it is not necessary to recite them, for as will be understood, details of construction, material employed, shape and proportions, depend largely upon the use to which the desired gauge is to be put; needless to say all such modifications may be made without departure from the invention.

What I claim as my invention and desire to secure by Letters Patent is:—

1. An ullage rod formed of a strip of fine mesh wire gauze, of from 80 to 120 per inch mesh and from .0048 to .004 of an inch in diameter, and a stiffening frame secured to the gauze and holding it extended.

2. An ullage rod formed of a strip of fine mesh wire gauze, of from 80 to 120 per inch mesh and from .0048 to .004 of an inch in diameter, and a stiffening frame of sheet metal inclosing a portion of the gauze and holding the strip extended.

3. An ullage rod formed of a strip of fine mesh wire gauze, of from 80 to 120 per inch mesh and from .0048 to .004 of an inch in diameter, and a stiffening frame formed of two strips of sheet metal bent double and inclosing the side edges of the strip of gauze and holding it extended.

4. An ullage rod formed of a strip of fine mesh wire gauze, of from 80 to 120 per inch mesh and from .0048 to .004 of an inch in diameter, and a stiffening frame provided with articulations, said frame being secured to the wire gauze and normally holding the strip extended and permitting one end portion of it to be arranged out of line with its other end portion.

In testimony whereof I affix my signature.

LOUIS JEAN LE CLAIR.